United States Patent Office

3,133,104
Patented May 12, 1964

3,133,104
STABLE LEAD ALKYL COMPOSITIONS AND A METHOD FOR PREPARING THE SAME
James D. Johnston, Hymin Shapiro, and Albert P. Giraitis, Baton Rouge, La., assignors to Ethyl Corporation, New York, N.Y., a corporation of Virginia
No Drawing. Filed June 8, 1962, Ser. No. 200,967
16 Claims. (Cl. 260—437)

This invention relates to alkyllead compositions which are stable at temperatures above 100° C. It also relates to methods for inhibiting the thermal decomposition of alkyllead compounds when subjected to temperatures above 100° C., at which temperature thermal decomposition becomes appreciable.

Generally this invention contemplates inhibiting the thermal decomposition of alkyllead compounds in which at least one valence of the lead is satisfied by an alkyl radical.

More specifically, this invention is concerned with an improved process for separating alkyllead compounds from the reaction products accompanying their synthesis. It is also applicable to a method for inhibiting thermal decomposition of an alkyllead product during its purification and blending with other products in making commercial antiknock fluids. It is applicable to minimizing the possibility of thermal decomposition during storage or transportation of an alkyllead product. It is especially applicable to preventing thermal decomposition of undiluted alkyllead compounds where the likelihood of thermal decomposition is more of a problem.

As is well known, tetraalkyllead antiknock compounds generally are produced by reacting a sodium-lead alloy with an alkyl halide. Due to recent marked improvements in the technology of alkyllead manufacture, thermal instability of alkyllead compounds during synthesis is no longer a problem. However, the tetraalkyllead compound so produced is in admixture with various reaction by-products from which it must be separated. Separation is effected by steam or vacuum distillation with subsequent purification of the tetraalkyllead distillate. Due to the toxic and unstable nature of tetraalkyllead antiknock compounds, these distillation and purification operations are subject to many difficulties.

In these distillation and purification operations meticulous temperature control and exact safety measures are of paramount importance. The rate of decomposition of the alkyllead compound increases rapidly with small rises in temperature above the temperature where thermal decomposition becomes appreciable. For example, decomposition of tetraethyllead occurs at the rate of approximately 2 percent per hour at a temperature of 100° C., which is the customary temperature used in separating tetraethyllead from the reaction products accompanying its synthesis. At temperatures above 100° C., the decomposition rate increases logarithmically so that a point is soon reached where external heat is no longer required and decomposition become selfpropagating.

Such likelihood of excessive decomposition is present also during blending, handling, storage, and transportation. Prior to diluting the alkyllead concentrate with scavengers, gasoline or other materials, the alkyllead compound remains a concentrate and the problem of excessive thermal decomposition exists, even though the temperature is maintained normally well below that of decomposition. For example, in the purification step wherein the tetraethyllead concentrate is washed and blown with air at atmospheric temperature to remove impurities, a sudden increase in temperature may occur due to the oxidation of triethylbismuth which is present as an impurity. Also pumps used in handling tetraethyllead occasionally "freeze" and the friction developed may cause a local overheating to a temperature above the temperature of decomposition of the tetraethyllead. Faulty wiring, leaks onto steam pipes, and other accidental causes also may produce local overheating with resulting dangerous decomposition.

It is seen therefore that in those operations where an alkyllead compound is in the undiluted or concentrated state—viz., separation, purification, blending, transportation, and storage—the likelihood of excessive thermal decomposition must be provided for and effectively combatted.

An object of this invention is to stabilize alkyllead compounds against thermal decomposition during one or more of the following operations: separation, purification, blending, transportation and storage.

The above and other objects of this invention are accomplished by incorporating with alkyllead compounds a relatively small quantity of a material having the property of inhibiting alkyllead thermal decomposition. The foregoing objects are also accomplished by conducting one or more of the foregoing operations in the presence of such a material. The materials which have been found to possess these unexpected properties are referred to hereinafter as "thermal stabilizers."

The thermal stabilizers of this invention are naturally occurring glyceride oils. It has been found that these naturally occurring fatty acid ester substances—commonly referred to simply as glycerides—are very effective in inhibiting the thermal decomposition of alkyllead compounds even when they are the sole additive associated with the alkyllead compounds. For this purpose concentrations of the naturally occurring glyceride oils ranging from about 0.5 to about 30 percent or more based on the weight of the alkyllead compound give very satisfactory results. Generally speaking, the preferred concentrations of these fatty acid ester substances range from about 2 to about 20 percent based on the weight of the alkyllead compound being stabilized.

It has been further found that the naturally occurring glyceride oils when used in conjunction with ethylene dibromide give rise to a synergistic inhibition of alkyllead decomposition. Thus, a preferred embodiment of this invention involves the utilization of a mixture of ethylene dibromide and at least one naturally occurring glyceride oil, the concentration of the ethylene dibromide being equivalent to from about 0.05 to about 0.5 mole per mole of alkyllead compound, the concentration of the glyceride oil ranging from about 0.5 to about 30 percent by weight based on the weight of the alkyllead compound. Here again the preferred concentration of the naturally occurring glyceride oil is from about 2 to about 20 percent by weight based on the weight of the alkyllead compound. These mixtures of the thermal stabilizers (i.e., ethylene dibromide+the glyceride oil) when used in the foregoing amounts are particularly effective in substantially retarding or preventing thermal decomposition of the alkyllead compounds at temperatures ranging from about 100° C. up to 195° C. for extended periods of time.

The identity and chemical makeup of the naturally occurring glyceride oils is, of course, well known to those skilled in the art. (Reference may be had, for example, to Bailey "Industrial Oil and Fat Products," Second Edition, Interscience Pub., New York, 1951.) These materials generally fall in several categories, namely; animal oils, vegetable oils and fish oils. As is well known in the art these naturally occurring glyceride oils are composed of mixtures of the glyceryl esters of saturated fatty acids and unsaturated fatty acids of molecular weights dependent to some extent on the source from which they are derived as well as the manufacturer's specifications applicable thereto. A feature of this invention is that these naturally occurring glyceride oils are available from a number of commercial suppliers at low cost. Furthermore, a large number of divergent types of glyceride oils can be so procured and can be successfully used in the practice of this invention. Thus, the discovery of the effectiveness of these glyceride oil thermal stabilizers in accordance with this invention makes possible the use of plentiful, readily available, low cost commodities of commerce. Although the chemical composition of individual glyceride oils is generally uniform, there is some variation from supplier to supplier and some variation from grade to grade of material. Nonetheless all of the commercially available glyceride oils tested were found to be useful in the practice of this invention. Thus, it can be confidently stated that all naturally occurring glyceride oils will exert a stabilizing effectiveness when utilized pursuant to this invention.

Examples of the glyceride oil thermal stabilizers of this invention include mutton tallow, cocoa butter, beef tallow, palm oil, European lard, American lard, cottonseed oil, peanut oil, olive oil, soybean oil, wheat oil, rice oil, linseed oil, sesame oil, rapeseed oil, butter fat, castor oil, coconut oil, cod liver oil, corn oil, poppyseed oil, babassu oil, pecan oil, sunflower seed oil, neat's-foot oil, menhaden oil, safflower oil, oiticica oil, almond oil, perilla oil, whale oil, tung oil, and the like. Other examples of suitable naturally occurring glyceride oils will be found in "Industrial Oil and Fat Products" by Bailey referred to hereinabove. Generally speaking, the preferred glycerides used pursuant to this invention are those in which the mole percentage to saturated fatty acids in the oil ranges from about 2 percent up to about 70 percent, the balance being essentially unsaturated fatty acids of the glyceride family. In some instances it may be desirable to solubilize the naturally occurring glyceride oil to provide substantial homogeneity when the same is associated with the alkyllead compound. Where such is desirable this can be accomplished readily by making use of hydrocarbon diluents, simple esters, ketones, alcohols, or related organic substances. In this connection the preferred embodiment of this invention in which ethylene dibromide is used conjointly with glyceride oil is of special advantage inasmuch as the ethylene dibromide serves as a convenient vehicle to further increase the solubility of glyceride oil in the alkyllead compound. Thus, this preferred embodiment gives rise to this enhanced solubility effect as well as providing synergistic improvements upon the thermal stability of the resultant alkyllead concentrate.

The chief thermal decomposition products of alkyllead compounds are lead metal and hydrocarbon gas. Hence, a very good index of alkyllead thermal decomposition is liberation of this gas.

To illustrate the effectiveness of this invention, a series of direct comparisons were made of the decomposition characteristics of unstabilized and stabilized tetraethyllead samples. A thermostatically controlled hot oil bath was fitted with a stirrer, thermometer, and a holder for a small reaction tube. A 100 cc. gas buret beside the bath, and equipped with a water-containing levelling bottle, was connected by means of rubber tubing with the reaction tube after the desired sample was introduced into this tube. After the bath was brought to a steady temperature of 195° C., the sample-containing tube was quickly immersed in the bath and clamped with the levelling bottle adjusted to hold the gas buret in place at a zero reading. Then measured was the time during which the sample was held at 195° C. without pronounced thermal decomposition and consequent gas evolution occurring. Thus, the longer the time, the more thermally stable was the alkyllead composition.

With pure tetraethyllead used in 1 ml. amounts, pronounced thermal deterioration occurred almost immediately as evidenced by rapid gas evolution. In fact, the decomposition of unstabilized tetraethyllead will normally become uncontrollable if it is heated, whether rapidly or slowly, to even 130° C., unless it is possible to very rapidly cool it down to about 100° C. or below.

The remainder of the compositions tested in the manner described above and the results thereby obtained are shown in the following tables.

TABLE I

Effect of Additives on Thermal Decomposition of Alkyllead Compounds at 195° C.

| No. | Glyceride | Glyceride Conc., Wt. Percent of TEL | Thermal Stability Time to Decomposition, Minutes |
| --- | --- | --- | --- |
| [Compositions of this Invention] | | | |
| 1 | Cottonseed oil | 5 | 44 |
| 2 | do | 15 | 110 |
| 3 | Palm oil | 5 | 5 |
| 4 | do | 15 | 10 |
| 5 | Lard oil | 5 | 12 |
| 6 | do | 15 | 18 |
| 7 | Neat's-foot oil | 5 | 11 |
| 8 | do | 15 | 22 |
| 9 | Corn oil | 5 | 33 |
| 10 | Cod liver oil | 15 | 47 |

TABLE II

Effect of Additives on Thermal Decomposition of Alkyllead Compounds at 195° C.

| No. | Glyceride | Glyceride Conc. Wt., Percent of TEL | Ethylene Dibromide, Mole/Mole TEL | Thermal Stability Time to Decomposition, Minutes |
| --- | --- | --- | --- | --- |
| [Compositions of this Invention] | | | | |
| 1 | Cottonseed oil | 5 | 0.1 | 100 |
| 2 | Corn oil | 5 | 0.1 | 91 |
| 3 | Neat's-foot oil | 15 | 0.1 | 89 |
| 4 | Cod liver oil | 5 | 0.05 | 75 |
| 5 | Lard oil | 15 | 0.05 | 31 |
| [Compositions not of this Invention] | | | | |
| 6 | None | nil | 0.05 | <1 |
| 7 | do | nil | 0.1 | 3 |
| 8 | do | nil | 0.25 | 43 |

It will be seen from the data in Table I above that a wide variety of glyceride oils exerted a thermal stabilizing effect upon the tetraethyllead even when the compositions were subjected to the high temperature of 195° C. The data in Table II show that a variety of the glyceride oil compositions when utilized in conjunction with ethylene dibromide give rise to a substantial synergistic effectiveness—i.e., the effectiveness of the whole was greater than the sum total of its parts. Similar behavior is exhibited by other glyceride oils when utilized either alone or in conjunction with ethylene dibromide.

The above-described beneficial behavior of the thermal stabilizers of this invention also takes place with other alkyllead compounds such as triethyllead bromide and tetrapropyllead. In fact, these compounds when stabilized can be boiled and distilled at atmospheric pressure.

This invention is adapted to the stabilization of tetraethyllead and other alkyllead compounds at various stages after they have been formed and the diluents or excess alkyl halide have been discharged from the autoclave. For example, one of the above thermal stabilizers may be added in appropriate quantity to the alkyllead reaction concentrate just before the separation step which is conducted at a temperature close to the temperature where hazardous run-away decomposition is particularly prevalent. By adding one of the above thermal stabilizers to the reaction concentrate just prior to distillation, the danger arising from unexpected temperature increases is substantially eliminated.

Most preferably the above thermal stabilizers are employed to stabilize the alkyllead compound both in storage and in shipping and especially to stabilize any alkyllead concentrate, i.e., compositions containing at least 80 percent by weight of alkyllead compound. If elevated temperature conditions are likely to be encountered, the addition of a small amount of thermal stabilizer to the alkyllead compound will economically and satisfactorily eliminate most of the hazard involved. While meticulous temperature control and exacting safety measures have been successful in reducing to a minimum the hazards of processing and handling of tetraethyllead, the use of this invention provides a much greater factor of safety. Furthermore, waste of the alkyllead product due to decomposition is considerably minimized through the use of this invention.

This invention is useful in stabilizing alkyllead compounds in which at least one valence of the lead is satisfied by an alkyl radical. For example, tetraethyllead, tetramethyllead, tetrapropyllead, dimethyldiethyllead, triethylphenyllead, and triethyllead bromide can be successfully stabilized against thermal decomposition by incorporating therein a relatively small quantity of one of the thermal stabilizers of this invention. This invention is particularly well suited to the stabilization of any mixture involving two or more of the following compounds: tetramethyllead, ethyltrimethyllead, diethyldimethyllead, triethylmethyllead, and tetraethyllead.

We claim:

1. A method of inhibiting the decomposition of an undiluted alkyllead compound at temperatures of from about 100° C. to about 195° C. which comprises the step consisting of incorporating with said compound from about 0.5 to about 30 percent of a naturally occurring glyceride oil based on the weight of said compound, said glyceride oil being characterized in that the mole percentage of saturated fatty acids therein ranges from about 2 up to about 70 mole percent, the balance thereof being essentially unsaturated fatty acids of the glyceride family.

2. The method of claim 1 wherein the concentration of said glyceride oil is from about 2 to about 20 percent based on the weight of said alkyllead compound.

3. A method of inhibiting the decomposition of an undiluted alkyllead compound at temperatures from about 100° C. to about 195° C. which comprises the step of incorporating with said compound a thermal stabilizer consisting of from about 0.05 to about 0.5 mole of ethylene dibromide per mole of said compound, and from about 0.5 to about 30 weight percent of a naturally occurring glyceride oil based on the weight of said alkyllead compound, said glyceride oil being characterized in that the mole percentage of saturated fatty acids therein ranges from about 2 up to about 70 mole percent, the balance thereof being essentially unsaturated fatty acids of the glyceride family.

4. The method of claim 3 wherein the concentration of said glyceride oil is from about 2 to about 20 percent based on the weight of said alkyllead compound.

5. A concentrated alkyllead composition consisting of an alkyllead compound with which has been blended from about 0.5 to about 30 weight percent, based on the weight of said compound, of a naturally occurring glyceride oil selected from the group consisting of cottonseed oil, corn oil, and cod liver oil.

6. In the process of producing an alkyllead compound by reacting a sodium lead alloy with alkyl chloride and separating the thus produced alkyllead compound from the reaction mass by steam distillation, the step which comprises conducting said steam distillation in the presence of a thermal stabilizer consisting of from about 0.05 to about 0.5 mole of ethylene dibromide per mole of said compound, and from about 0.5 to about 30 percent of a naturally occurring glyceride oil based on the weight of said alkyllead compound, said glyceride oil being characterized in that the mole percentage of saturated fatty acids therein ranges from about 2 up to about 70 mole percent, the balance thereof being essentially unsaturated fatty acids of the glyceride family.

7. A concentrated alkyllead composition consisting of an alkyllead compound with which has been blended from about 0.5 to about 30 weight percent of a naturally occurring glyceride oil based on the weight of said compound, said glyceride oil being characterized in that the mole percentage of saturated fatty acids therein ranges from about 2 up to about 70 mole percent, the balance thereof being essentially unsaturated fatty acids of the glyceride family.

8. The composition of claim 7 wherein the concentration of said glyceride oil is from about 2 to about 20 weight percent based on the weight of said alkyllead compound.

9. A concentrated alkyllead composition consisting essentially of an undiluted alkyllead compound with which has been blended a thermal stabilizer consisting essentially of from about 0.05 to about 0.5 mole of ethylene dibromide per mole of said compound, and from about 0.5 to about 30 weight percent of a naturally occurring glyceride oil based on the weight of said allkyllead compound, said glyceride oil being characterized in that the mole percentage of saturated fatty acids therein ranges from about 2 up to about 70 mole percent, the balance thereof being essentially unsaturated fatty acids of the glyceride family.

10. The composition of claim 9 wherein the concentration of said glyceride oil is from about 2 to about 20 weight percent based on the weight of said alkyllead compound.

11. The composition of claim 7 wherein said compound is selected from the group consisting of tetramethyllead, ethyltrimethyllead, diethyldimethyllead, triethylmethyllead, tetraethyllead, and mixtures thereof.

12. The composition of claim 9 wherein said compound is selected from the group consisting of tetramethyllead, ethyltrimethyllead, diethyldimethyllead, triethylmethyllead, tetraethyllead, and mixtures thereof.

13. The composition of claim 9 wherein said oil is cod liver oil.

14. The composition of claim 9 wherein said oil is cottonseed oil.

15. The composition of claim 9 wherein said oil is corn oil.

16. The composition of claim 9 wherein said oil is neat's-foot oil.

References Cited in the file of this patent

UNITED STATES PATENTS

| | | |
|---|---|---|
| 1,645,375 | Daudt | Oct. 11, 1927 |
| 2,155,678 | Oosterhout | Apr. 25, 1939 |